United States Patent
Sheridan et al.

[11] 3,725,522
[45] Apr. 3, 1973

[54] METHOD OF MANUFACTURE OF BALLOON-TYPE CATHETERS

[75] Inventors: David S. Sheridan, Argyle; Isaac S. Jackson, Greenwich, both of N.Y.

[73] Assignee: David S. Sheridan, Argyle, N.Y.

[22] Filed: July 12, 1971

[21] Appl. No.: 161,878

Related U.S. Application Data

[62] Division of Ser. No. 860,278, Oct. 23, 1969, Pat. No. 3,615,793.

[52] U.S. Cl. ................264/138, 264/296, 264/320, 264/322
[51] Int. Cl. .................................................B29c 1/14
[58] Field of Search..............264/296, 320, 322, 138; 425/812

[56] References Cited

UNITED STATES PATENTS

| | | | |
|---|---|---|---|
| 3,405,439 | 10/1968 | Uemura | 264/320 X |
| 2,635,287 | 4/1953 | Taber | 264/320 |
| 3,399,257 | 8/1968 | Ueno | 264/134 |

FOREIGN PATENTS OR APPLICATIONS

| | | | |
|---|---|---|---|
| 739,871 | 8/1966 | Canada | 264/320 |

*Primary Examiner*—Donald J. Arnold
*Assistant Examiner*—Richard R. Kucia
*Attorney*—Solon B. Kemon et al.

[57] ABSTRACT

The distal ends of plastic catheters, particularly endotracheal tubes, that have both a major lumen and a secondary lumen in the wall are finished to seal the secondary lumen at its distal end and create an angled distal end on the catheter with a smooth convex surface tip by a molding operation preformed in a vented mold structured to maintain the full opening of the major lumen in the finished distal end.

4 Claims, 11 Drawing Figures

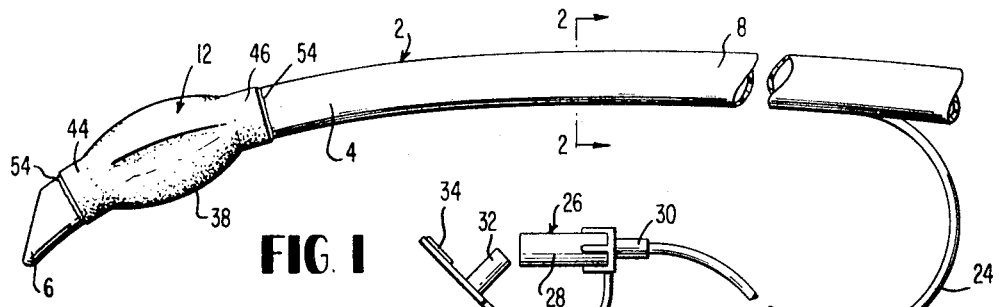
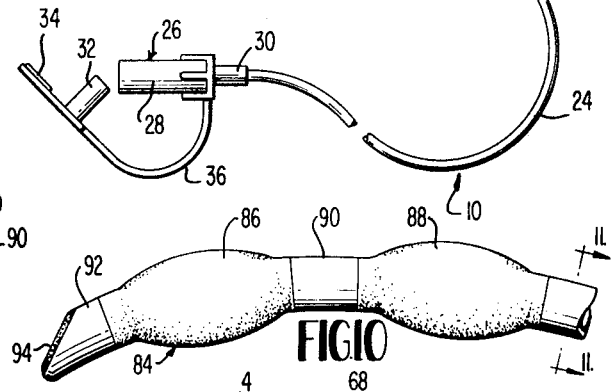
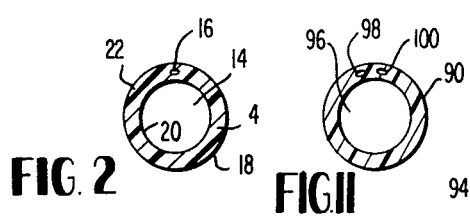
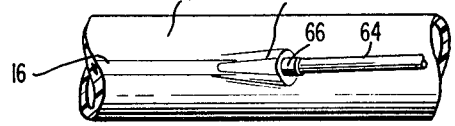
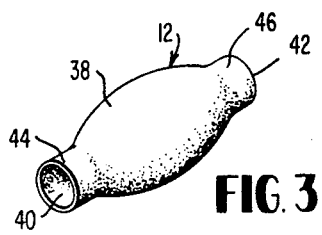
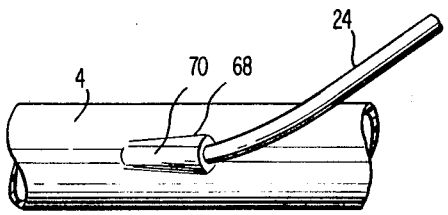
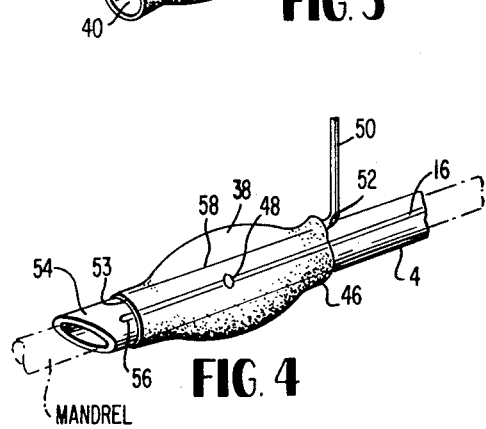
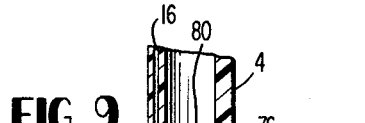
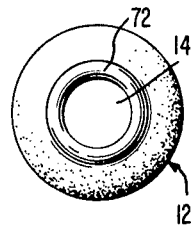
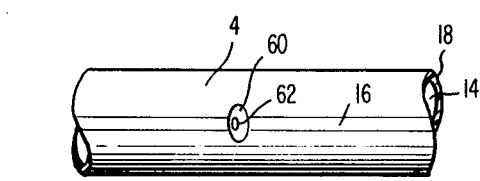

METHOD OF MANUFACTURE OF BALLOON-TYPE CATHETERS

CROSS-REFERENCE TO RELATED APPLICATION

This application is a division of copending application Ser. No. 860,278, filed Sept. 23, 1969, now U.S. Pat. No. 3,625,793.

BACKGROUND OF THE INVENTION

This invention relates to balloon-type catheters, i.e., catheters which are provided at the distal end with an inflatable balloon or cuff which serves, during the medical or surgical procedure performed using the catheter, to retain the catheter in a desired position within the patient, to close a passage in the patient, etc.

Medico-surgical tubes may assume a variety of sizes, shapes and be provided with a variety of fluid openings, couplings, connectors or the like. Terminology applied to such devices by users, e.g., physicians, surgeons, hospitals, etc., frequently refer to them as catheters, e.g., rectal catheters, urethral catheters, hemostatic catheters and the like, but in other cases they are referred to as tubes, e.g., endotrachael tubes, feeding tubes, suction tubes, drain tubes and the like. For the sake of brevity in describing the improved devices of the invention and their method of production, the term "catheter" is employed throughout the specification and accompanying claims to encompass pertinent medicosurgical devices whether they be popularly referred to by the medical profession and other users as "catheters" or "tubes."

The modern trend in medical and surgical practices is toward the use of disposable catheters, i.e., those which may be used a single time on one patient and then discarded. The high cost of labor in sterilizing tubes of the reusable type tends to offset the cost of a single use disposable catheter. Also, the use of a disposable catheter reduces cross-infection cases which constitute a serious problem in hospital operations. Of course, the cost of a disposable catheter must be competitive with the cost of a reusable type over its usable life span plus the cost of sterilizing the reusable catheter. Hence, it is necessary for the acceptance and a practical utilization of disposable-type catheters that they be manufactured at a minimum cost. Reduction in cost of manufacture of simple catheters such as rectal tubes, Foley catheters and the like have been possible so that reusable catheters of this class are rapidly being displaced in the industry by disposable-type catheters. On the other hand, the more complicated construction and manufacturing costs associated with the production of balloon-type catheters has not permitted these catheters heretofore to be in major proportion of the disposable type, i.e., reusable balloon-type catheters are still extensively used because of cost and construction factors.

A factor that has contributed to the cost of disposable catheters, particularly endotrachael tubes which have a relatively large distal end opening, is the finishing of the distal tip. In the past this has involved extensive hand work, i.e., grinding, buffing and polishing and required a high degree of skill in the finishing operators even to accomplish a mediocre result. The utilization of balloon-type as well as other disposable catheters would be improved if a method of finishing the distal tips with less hard work, need for less skilled workers, or both, could be provided.

OBJECTS

The principal object of the present invention is the provision of new improvements in catheters and their production. Further objects include the provision of:

1. New methods for the production of disposable plastic balloon-type catheters.
2. New methods for the shaping and polishing of the distal end tip of medico-surgical tubes and particularly balloon-type catheters comprising a major lumen and at least one secondary lumen within the wall of the catheter.

SUMMARY OF THE INVENTION

The method of closing the secondary lumen distally of the opening which connects the secondary lumen to the balloon cuff of the catheter is accomplished by forcing the distal end of the tube into a mold heated to a temperature sufficient to produce plastic flow of the plastic material of the tube, the mold having a concave contour to create a smooth convex surface upon the end of the tube.

This heating and molding step simultaneously polishes the end of the tube and closes the secondary lumen so that any fluid passed into the secondary lumen through the inflation tube will be forced to enter the balloon cuff.

DESCRIPTION OF THE DRAWINGS

A more complete understanding of the new methods and the devices of the invention may be had by reference to the accompanying drawings in which:

FIG. 1 is a fragmentary plan view of an endotrachael tube formed in accordance with the invention showing for most part the distal end portion of the tube and also illustrating the attached balloon inflation means of the catheter.

FIG. 2 is an enlarged sectional view taken along the line 2—2 of FIG. 1.

FIG. 3 is a perspective view of an elastic inflatable balloon cuff with opposed shouldered openings of the type used in the invention in forming the inflatable balloon feature of the new catheters.

FIG. 4 is a fragmentary perspective view illustrating one step in the method of affixing a balloon cuff of the type shown in FIG. 3 to the distal end of a catheter in accordance with the invention.

FIG. 5 is a fragmentary enlarged side view of the section of a catheter in accordance with the invention in one stage of affixing a section of inflation tube to the secondary lumen of the balloon-type catheter.

FIG. 6 is a fragmentary side view related to FIG. 5 showing the catheter in a further stage of installation of the inflation tube.

FIG. 7 is a fragmentary side view related to FIGS. 5 and 6 showing the inflation tube installed upon the catheter.

FIG. 8 is an enlarged distal end view of the catheter shown in FIG. 1 with the balloon cuff inflated.

FIG. 9 is a fragmentary side view, partially in section, illustrating a step in the heat molding of the distal end portion of catheters in accordance with the invention.

FIG. 10 is a fragmentary side view of a catheter in accordance with the invention which has a pair of inflatable balloons and a pair of secondary lumens.

FIG. 11 is an enlarged, sectional view taken on the line 11—11 of FIG. 10.

Referring in detail to the drawings, the endotrachael tube 2 comprises a non-fibrous tube 4, a distal end 6, a central body portion 8, a proximal and (not shown), inflation means 10 and elastic inflatable balloon means 12. As will be understood by those skilled in the art, devices of this type will vary in size to accommodate different patients and operative conditions, e.g., typical endotrachael tube would have an inside diameter of 7.0 mm., an outside diameter of 9.3 mm., a length of about 12 inches and will be of arcuate form defining a circle of radius about 5-12 inches.

The cross-section of the endotrachael tube of FIG. 1 as shown in FIG. 2 is representative of all of the balloon-type catheters of the invention having a single secondary lumen. The tube 4 defines a major lumen 14 having an area equal to at least one-half the cross-sectional area of the tube 4 and a secondary lumen 16 which is of smaller diameter than the wall thickness of the tube so that the lumen 16 is formed completely within the wall 18 of the tube 4. By this construction, the inside wall 20 and outside wall 22 of the tube 4 may be completely smooth and uninterrupted by protrusions, indentations or the like. As a consequence, the major lumen 14 can have its entire cross-section maintained throughout the entire length of the catheter 2 from the distal end 6 through to the proximal end. Similarly, the outside surface 22 of the catheter will present a smooth, uniform circular cross-section.

Using standard extrusion apparatus and techniques, the tube 4 will present smooth, highly polished or so-called "plate finish" surfaces 20 and 22. However, the endotrachael tube 2 or any other balloon-type catheter formed in accordance with the invention may be provided with a frosted surface, in whole or in part, for the purposes and using the methods described and claimed in co-pending application Ser. No. 772,890, filed Nov. 4, 1968 for "Medico-surgical Tubes Having Frosted Surface."

The inflation means 10 is formed of a section of extruded tubing 24 and closure means 26. This closure means can take any convenient form such as a syringe puncture plug of the type shown in U.S. Pat. No. 2,896,629, but in the preferred embodiment shown in FIG. 1, the closure means 26 comprises a cylindrical portion 28, a nipple 30 into which the tubing section 24 is cemented, a plug 32, a pull-tab 34, and a flexible connector strip 36. The entire closure unit 26 is advantageously formed of flexible plastic material by injection molding, but may be formed in any other suitable fashion from other materials such as semi-rigid plastics, rubber or the like by compression molding, dip coating or the like.

The ballon means 12 comprises an elastic inflatable balloon cuff 38 having a pair of opposed circular openings 40 and 42 defined by short integral tubular extensions or shoulders 44 and 46, respectively. The shoulders 44 and 46 have an inside diameter slightly smaller than the outside diameter of the tube 4, e.g., about 0.1 to 1.0 mm and particularly about 0.5 mm. smaller than the tube.

In important feature of catheters produced in accordance with the invention is illustrated in FIG. 8. The distal end tip 72 is smoothly rounded in a convex contour. This is important in attaining smooth entry of the catheter into the body of a patient without tendency to tear or injure tissue during the insertion procedure. Of equal importance, however, is the fact that the smooth rounding of the tube end 72 does not result in any reduction in the diameter of the major lumen 14. This is in contrast to any prior tube end polishing procedures which have employed heat or solvent to attain a polishing of the tube end since such prior known methods result in a contraction of the tube end producing a substantial reduction in the diameter of the tube opening at the distal tip.

The manner of obtaining the desired smooth rounded finish to the distal end tip 72 without diminution in the lumen 14 and a simultaneous sealing of the end 56 of the secondary lumen 16 is illustrated in FIG. 9. A mold made of metal or any other suitable material which may be heated to a temperature sufficient to soften the plastic material of which the catheter is made, e.g., between about 170°-450°F., is formed with a cavity 76 shaped with a rounded bottom 78 to the contour desired in the end 72 of the catheter. A central pin or extension 80 having the exact outside dismeter corresponding to the diameter of the major lumen 14 is provided in the mold 74. Also, one or more vent holes 82 are provided in the mold to permit air to excape upon the insertion of the distal end 6 of the catheter into the heated mold 74. With the mold heated as indicated, the distal end of the catheter is forced into the mold cavity 76 with sufficient pressure at the temperature of the mold to create plastic flow in the plastic material of the tube 4. This causes the tip 72 of the tube to be contoured into a smoothly rounded tip and at the same time to produce the seal 54 at the end of the secondary lumen 16 for the purpose described hereinbefore.

The formation of the polished tip on catheters in accordance with the invention is particularly important with catheters having an angular distal end, e.g., endotrachael tubes as shown in FIG. 1. Using the procedures of the invention it is possible to convert a square-cut end of a tube into a polished angular tip in a single pressure molding operation. The provision of the small air vent in the base of the shaping mold permits the plastic which is softened by heat exchange with the heated mold, to flow into the bottom of the mold cavity. In doing this, a small amount of molten plastic may exit through the vent, but this can be sheared off easily leaving the catheter with a nicely polished distal tip. All this is accomplished quickly and without reducing the inside diameter or increasing the wall thickness of the catheter at the distal end.

DISCUSSION OF DETAILS

New balloon-type catheters of the invention may be manufactured to professional specifications and may be produced in varying degrees of flexibility or rigidity by varying the formulation of the plastic material from which the tubes are extruded. They may be used interchangeably with similar catheters which do not incorporate the improved features of the new devices of the invention.

The new disposable catheters of the invention should be water-proof, flexible over a relatively wide range of temperatures, resistant to attack by body fluids, capable of being sterilized, such as by exposure to ethylene oxide or gamma radiation, and capable of being produced by extrusion at high speeds and at relatively low costs. There are a variety of plastic materials capable of providing these requirements in the production of disposable, single use catheters. Advantageously, the new catheters will be formed of non-fibrous plastic material and a particularly useful material for this purpose is plasticized polyvinyl chloride. However, other thermoplastic materials which are useful in forming the catheters are available, e.g., nylon, polyethylene or other polyolefins and equivalent materials. A particularly useful material is plasticized polyvinyl chloride formulated to have an extrusion temperature of about 325°–375°F. and especially 350° F. The present invention is contemplated for use in connection with any plastic material known or found to be useful in the formation of disposable catheters.

The plastic material used in forming the new catheters may be unpigmented. However, in some cases, pigments designed to give X-ray opacity may be incorporated in the plastic material. In a preferred embodiment of the invention, a small amount of very finely divided white pigment, e.g., about 0.01 to 1 percent by weight of titanium dioxide pigment, is incorporated in the otherwise transparent plastic material used in forming the catheter to give the final extruded tube a milky translucency, but still retaining sufficient transparency to permit the major lumen to be viewed through the side wall of the catheter. It has been found that this milky translucency creates a clean appearance but retains a "see-through" quality which emphasizes the presence within the major lumen of obstruction materials such as articles of body tissue, blood clots and the like.

The new catheters may include special features which are known in the construction of medico-surgical tubes and which may be required for particular procedures in which the new catheters are to be employed. These may include a non-sparking feature (see U.S. Pat. No. 3,070,132), X-ray line feature (see U.S. Pat. No. 2,857,915) or a tapered section feature (see U.S. Pat. No. 2,940,126).

In accordance with known practice, markings may be applied to the catheters to designate the distance from the distal end to aid the physician or surgeon in the use of the tube. As will be understood by those skilled in the art, these distance markings will vary with the tube size, e.g., with a 5.5 mm. I.D. tube, the marks will generally designate 12, 13.5 and 15 cm. distance from the distal end and with a 7.0 mm., I.D. tube, the markings will designate 18, 20 and 22 cm. from the distal end for endotrachael tubes which constitute one of the important forms of catheters which can be made by the invention.

CONCLUSION

This invention as described herein provides balloon-type catheters having noteworthy improvements while permitting such catheters to be made at substantial savings in costs. The new methods for producing balloon catheters. Hence, the invention makes a reality of single-use, disposable balloon-type catheters.

The embodiments of the invention in which an exclusive property or right is claimed are defined in the accompanying claims.

We claim:

1. A method of finishing the distal end of a plastic catheter having a major lumen presenting an area equal to at least one-half the cross-sectional area of the catheter and a secondary lumen of smaller diameter than the wall thickness of the catheter to seal said secondary lumen at its distal end and create an angled distal end on the catheter having a smooth convex surface tip which comprises cutting the distal end of a catheter at an angle relative to the longitudinal axis of the catheter, providing a mold having a central pin therein corresponding in size to said major lumen of the catheter, said pin having a top and being surrounded at its sides by a mold cavity having a base with a concave contour that is angled relative to the longitudinal axis of said pin, said base having a vent hole therein adjacent the portion furtherest removed from said pin top, heating said mold to a temperature above the temperature of plastic flow for said catheter, inserting the cut end of the catheter into said mold so the angle of the catheter end and the angle of said contour are substantially aligned, forcing the catheter into said mold with sufficient pressure to cause plastic flow in the end of the catheter against said concave countour and then withdrawing the catheter from said mold.

2. The method of claim 1 wherein said catheter is an endotracheal tube having a permanent arcuate shape and said secondary lumen is on the inside curve of said arcuate shape.

3. The method of claim 1 wherein the mold is cooled below the plastic flow temperature of the catheter before the catheter is withdrawn from the mold.

4. The method of claim 1 wherein said temperature to which said mold is heated is between about 170°–450°F.

* * * * *